United States Patent
Wadkins et al.

(10) Patent No.: US 9,407,557 B2
(45) Date of Patent: Aug. 2, 2016

(54) METHODS AND SYSTEMS TO SPLIT EQUIPMENT CONTROL BETWEEN LOCAL AND REMOTE PROCESSING UNITS

(71) Applicant: Edgewater Networks, Inc., Santa Clara, CA (US)

(72) Inventors: Douglas L. Wadkins, Los Gatos, CA (US); Yun-Fong Loh, Mountain View, CA (US); Surendra Prajapat, Cupertino, CA (US)

(73) Assignee: EDGEWATER NETWORKS, INC., San Jose, CA (US)

( * ) Notice: Subject to any disclaimer, the term of this patent is extended or adjusted under 35 U.S.C. 154(b) by 221 days.

(21) Appl. No.: 14/081,352

(22) Filed: Nov. 15, 2013

(65) Prior Publication Data

US 2014/0181267 A1 Jun. 26, 2014

Related U.S. Application Data

(60) Provisional application No. 61/745,589, filed on Dec. 22, 2012.

(51) Int. Cl.
*H04L 12/801* (2013.01)
*H04L 12/24* (2006.01)
*H04L 29/06* (2006.01)

(52) U.S. Cl.
CPC .......... *H04L 47/193* (2013.01); *H04L 41/0893* (2013.01); *H04L 69/163* (2013.01); *H04L 69/22* (2013.01)

(58) Field of Classification Search
CPC ..... H04L 47/193; H04L 69/22; H04L 69/163; H04L 41/0893
See application file for complete search history.

(56) References Cited

U.S. PATENT DOCUMENTS

| | | | | |
|---|---|---|---|---|
| 6,788,696 B2 * | 9/2004 | Allan | ................. | H04Q 11/0478 370/230 |
| 7,475,154 B2 * | 1/2009 | Chetuparambil | ....... | H04L 69/16 709/203 |
| 7,490,164 B2 * | 2/2009 | Srivastava | ............... | H04L 45/50 370/235 |
| 7,512,702 B1 * | 3/2009 | Srivastava | ............... | H04L 45/00 370/236 |
| 7,549,159 B2 * | 6/2009 | Shay | ........................ | G06F 21/57 726/1 |
| 7,653,073 B2 * | 1/2010 | Dowker | .............. | H04L 12/2801 370/401 |
| 7,784,055 B2 * | 8/2010 | Srivastava | ......... | H04L 29/12066 370/229 |
| 7,809,840 B2 * | 10/2010 | Jing | ........................ | H04L 12/14 709/203 |
| 7,924,793 B2 * | 4/2011 | Savoor | ................ | H04L 41/0896 370/254 |

(Continued)

FOREIGN PATENT DOCUMENTS

EP 1887741 B1 3/2010

*Primary Examiner* — Jimmy H Tran
(74) *Attorney, Agent, or Firm* — David R. Stevens; Stevens Law Group

(57) ABSTRACT

Techniques for distributing computation and storage tasks between customer premises equipment and a remote vendor computer are disclosed. The techniques include receiving, at a customer premises computer equipment, a TCP-based data flow from a client, rewriting the IP header of the TCP-based data flow, and forwarding the TCP-based data flow to a defined TCP port. The techniques also include a transient termination server process operating in user space of the customer premises equipment to read an application payload sent by the client and sending data to a deep packet inspection engine for classification. The techniques may include identifying, from the client data flow, a protocol associated with the data flow, looking up a handling policy from a policy cache stored in the customer premises equipment, and handling the data flow according to the handling policy.

20 Claims, 8 Drawing Sheets

(56) References Cited

U.S. PATENT DOCUMENTS

| | | | |
|---|---|---|---|
| 8,005,101 B1 | 8/2011 | Kleyman | |
| 8,077,732 B2* | 12/2011 | Voit | H04L 12/4633 370/352 |
| 8,417,821 B2* | 4/2013 | Jing | H04L 12/14 370/401 |
| 8,474,031 B2* | 6/2013 | Vennelakanti | G06F 21/33 713/1 |
| 8,930,552 B2* | 1/2015 | Ueno | H04L 45/42 370/229 |
| 8,949,979 B1* | 2/2015 | Newstadt | H04L 29/06 726/22 |
| 9,197,857 B2* | 11/2015 | VerSteeg | G06Q 30/02 |
| 9,264,365 B2* | 2/2016 | Agrawal | H04L 69/163 |
| 2001/0048683 A1* | 12/2001 | Allan | H04Q 11/0478 370/395.21 |
| 2003/0212999 A1* | 11/2003 | Cai | H04L 12/66 725/119 |
| 2005/0256957 A1* | 11/2005 | Shay | H04L 63/1433 709/225 |
| 2006/0002369 A1* | 1/2006 | Dowker | H04L 12/2801 370/351 |
| 2006/0029000 A1* | 2/2006 | Waldvogel | H04L 69/16 370/254 |
| 2006/0190609 A1* | 8/2006 | Chetuparambil | H04L 69/16 709/228 |
| 2007/0156919 A1 | 7/2007 | Potti | |
| 2008/0117836 A1* | 5/2008 | Savoor | H04L 41/0896 370/254 |
| 2008/0235382 A1* | 9/2008 | Marwah | H04L 69/16 709/228 |
| 2009/0059788 A1* | 3/2009 | Granovsky | H04L 47/10 370/235 |
| 2009/0070489 A1* | 3/2009 | Lu | H04L 29/06 709/245 |
| 2009/0182835 A1* | 7/2009 | Aviles | G06F 12/0813 709/213 |
| 2009/0217318 A1* | 8/2009 | VerSteeg | G06Q 30/02 725/32 |
| 2010/0174817 A1* | 7/2010 | Chetuparambil | H04L 69/16 709/227 |
| 2010/0325305 A1* | 12/2010 | Jing | H04L 12/14 709/232 |
| 2011/0002240 A1 | 1/2011 | Harel | |
| 2011/0206043 A1 | 8/2011 | Williams | |
| 2011/0289230 A1* | 11/2011 | Ueno | H04L 45/42 709/228 |
| 2011/0296125 A1* | 12/2011 | Shaikh | G06F 21/30 711/159 |
| 2012/0110128 A1* | 5/2012 | Aaron | H04L 67/1008 709/219 |
| 2012/0127882 A1 | 5/2012 | Edwards | |
| 2012/0220330 A1 | 8/2012 | Goldner | |
| 2012/0321052 A1 | 12/2012 | Morrill | |
| 2013/0152200 A1* | 6/2013 | Alme | H04L 63/145 726/24 |
| 2013/0163498 A1* | 6/2013 | Senga | H04W 80/06 370/311 |
| 2014/0036674 A1* | 2/2014 | Agrawal | H04L 47/193 370/235 |
| 2014/0310392 A1* | 10/2014 | Ho | H04L 69/16 709/223 |

\* cited by examiner

METHODS AND SYSTEMS TO SPLIT EQUIPMENT CONTROL BETWEEN LOCAL AND REMOTE PROCESSING UNITS

RELATED APPLICATIONS

The present application claims the benefit of U.S. Provisional Application Ser. No. 61/745,589, filed Dec. 22, 2012, which is expressly incorporated herein in its entirety.

BACKGROUND INFORMATION

1. Field of the Disclosure

The present invention relates to control of computer equipment. In particular, examples of the present invention relate to an approach for splitting control of computer equipment at a customer location between the local equipment and remote equipment.

2. Background

Many organizations such as businesses rely on computer networks. Computer networks may frequently include local computers such as work stations and servers and may also interface with remote customer computers via the internet. Frequently, computer networks have a gateway computer which is responsible for management of network traffic. For example, a computer may provide network security and manage both local network traffic and internet traffic. As network/internet communications bandwidth has increased, demand for rich content in documents, media, webpages, etc. has also increased. As network traffic increases, it becomes increasingly difficult for a gateway computer to manage network traffic. It becomes cost prohibitive for many organizations to maintain a gateway computer with sufficient processing power and storage capacity to fully satisfy the network traffic demands.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
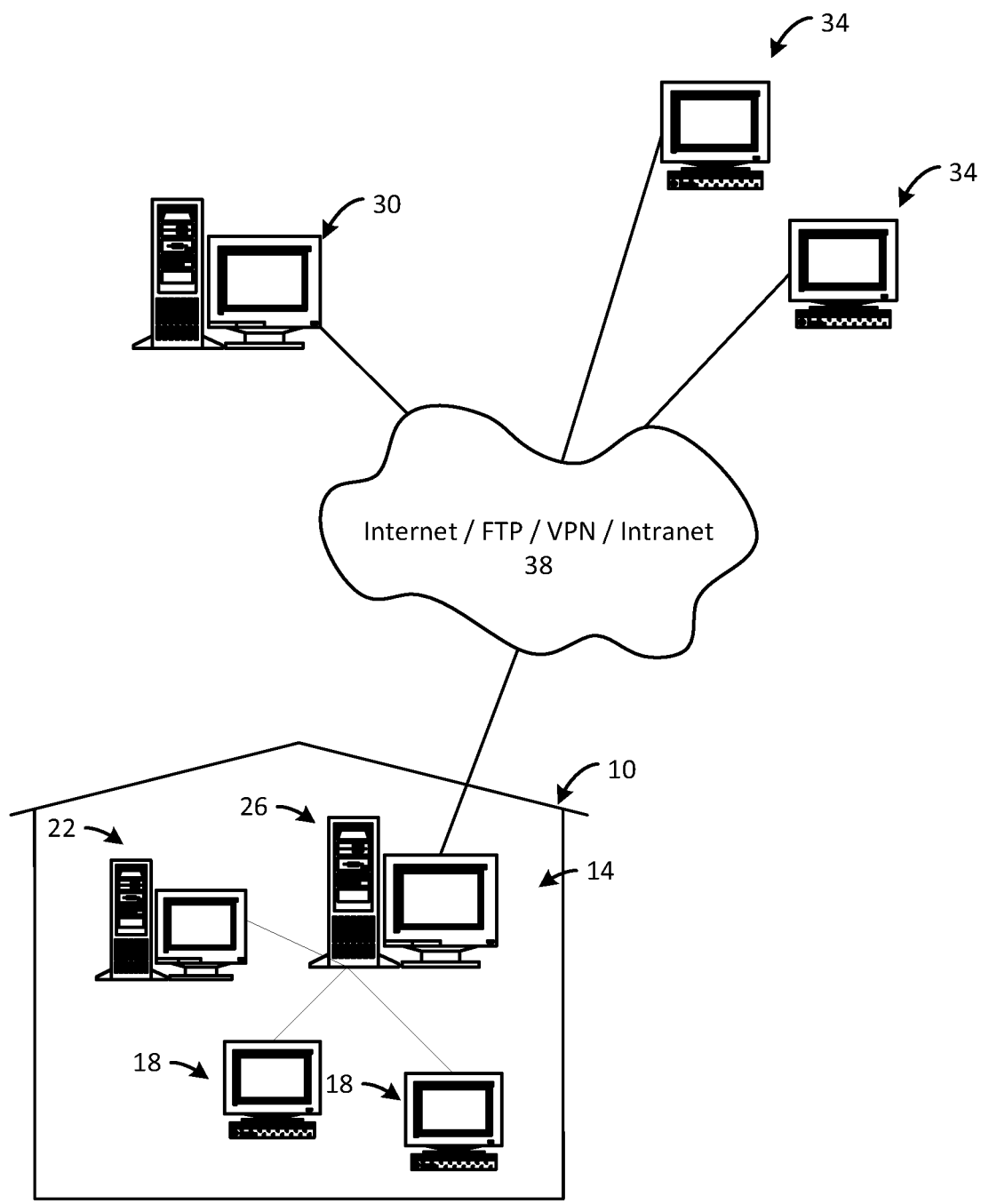
FIG. 1 is a schematic illustrating various aspects of a computer system according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how vendors may manage load on customer networks. Particularly, the present disclosure describes how a vendor may manage data processing and data storage load on a gateway computer in a customer network. A gateway computer is a computer which controls network traffic within the network.

Referring to FIG. 1, an organization 10 may operate a computer network 14. The organization may be a business, educational institution, government institution, etc. The organization is typically referred to herein as a customer as they may be a customer of a vendor who provides management and reduction of gateway computer load as exemplified herein. Additionally, third part users are discussed herein. Third party users may be persons/computers that access the network 14 or otherwise communicate with the network to transmit or receive data.

The customer computer network 14 may include individual computers such as workstations 18, a server 22, and a gateway computer 26. Computers within the customer computer network 14 may communicate with each other via a network such as a local area network. Computers within the customer computer network may also interact with a vendor computer 30 and a third party computer 34 via the internet 38. It is appreciated that the various computers typically communicate with other computers via network devices such as routers, switches, modems, etc.

By way of example, the customer 10 may be a business and the customer network 14 may include employee computers 18 which may communicate with other employee computers 18 or a business server 22 and which may also communicate with computers outside the customer network 10 such as third party computers 34. In this context, the third party computers 34 may be data servers at other organizations. Third party computers 34 may also include personal computers of persons who receive products, services, or information from the customer 10 and communicate with the customer 10, such as by receiving information from a customer server 22.

A gateway computer 26 may manage network traffic within the customer network 14. In one example, the gateway computer may provide the customer 10 with comprehensive security and may perform multiple security functions such as network firewalling, network intrusion prevention, gateway antivirus, gateway anti-spam, virtual private networks (VPN), content filtering, load balancing, data leak prevention, and reporting.

The vendor computer 30 may work with the gateway computer 26 to manage the processing and data storage load of the gateway computer 26. Progress in computer design and manufacturing has made computers, routers, internet service, etc. increasingly more powerful and consumer demand in the type and quality of content has similarly risen. As internet and network bandwidth increase, gateway computers 26 frequently become unable to manage network traffic at a price point which is affordable by most companies.

In one example, a gateway computer 26 may perform network security tasks for an organization 10. Broad types of network security tasks may be referred to as unified threat management (UTM). UTM tasks may include network security tasks such as network firewalling, network intrusion prevention, gateway antivirus, gateway anti-spam, virtual private networking (VPN), content filtering, load balancing, data leak prevention, and reporting.

As bandwidth has become more economically available WAN link speeds are increasing dramatically. The result is that a traditional UTM gateway 26 cannot perform all the functions and maintain throughput of 200 Mbps plus at a price point that many businesses can afford due to the increased computation and storage requirements.

Computational and storage load is shared between the gateway computer 26 and a remote vendor computer 30 to permit the gateway computer to operate at a higher throughput that otherwise possible. The vendor computer 30 provides a scalable and elastic source of storage and computational power.

The software, hardware, and associated components of a customer computer system 14 may be programmed and configured to implement one or more embodiments described herein. A vendor computer 30 may communicate with a gateway computer 26 via a network connection or internet connection 38 to assume computational and storage tasks pertaining to network traffic through the gateway computer 26. The vendor computer 30 and gateway computer 26 may use hardware, firmware, software, etc. which allows the vendor computer 30 to receive data which is directed towards the gateway computer 26 and perform tasks 30 pertaining to the gateway computer 26.

In one aspect, the present invention provides a method to split the control of customer premises equipment (CPE) such as a gateway computer 26 between an off-board central processing unit (CPU) such as the CPU of vendor computer 30 and the CPU in the gateway computer 26 by storing the state of the gateway CPE in the off-board environment and updating that state when necessary and then coupling the off-board environment to the actual CPE using software-defined networking (SDN) techniques.

For example, packet headers may be used to generate mean opinion scores. This allows execution of the mean opinion score (MOS) algorithm, which is expensive from a CPU perspective, on an off-board processor. Similarly, other applications that might typically require full packets can be executed on the off-board processor instead. For example there are middle box security applications that invoke different policies that do not need the full packet to make the policy decision. These middle box applications can now be executed in an offboard environment freeing up the CPE CPU.

State may be used as a way to achieve split processing. The physical CPE 26 may have a flow table that controls what happens for each flow in progress or future flows that have known characteristics. That flow table is also stored in the virtual environment 30. In addition the other characteristics of the physical CPE 26 are modeled as a state and stored in the virtual environment (i.e. the vendor computer 30). Typical CPE services such as routing, firewall, etc. are run as rules engines that can modify the state associated with a given CPE when needed. This solves the problem of having to run a virtual instance of a router, firewall, etc. for each instance of CPE in this split environment. Instead, each CPE is represented by a stored state and one logical router, firewall, etc. is run that just modifies that state when necessary.

As the state of a flow is persistent to some extent this also increases the performance of the CPE 26 by offloading the heavier computational problems to the virtual environment 30 and then just asking to recompute when necessary. Thus storing the state table in the physical CPE 26 and using that to allow fast path processing through the CPE 26 improves CPE throughput, reduces the amount of chatter on the control channel (saving bandwidth and datacenter load) as well as reducing the latency associated with previous split processing models.

Survivability rules may be used in the split processing model and the algorithms to detect when to go into survivability mode, for which applications, and when to revert.

Service Providers and enterprise networks are populated with a large number and an increasing variety of proprietary hardware appliances. To launch a new network service often requires either a change to the proprietary hardware device or adding an additional device. Finding the space, power, capital, and skilled personal to design, integrate, and operate these increasingly complex appliances is becoming harder and harder. Moreover, hardware-based appliances rapidly reach end of life, requiring much of the procure-design-integrate-deploy cycle to be repeated with little or no revenue benefit. Worse, the product lifecycles are becoming shorter as technology and services innovation accelerates, inhibiting the roll out of new revenue earning network services and constraining innovation in an increasingly network-centric connected world.

Network functions virtualization (NFV) is used as an alternative to the hardware appliance centric approach with the goal of transforming the way that operators architect networks by utilizing IT virtualization technology to consolidate many network equipment types onto industry standard high volume servers, switches and storage, which could be located in remotely in data centers, in network nodes and even in the end user premises. Network functions may be implemented in software that can run on a range of industry standard server hardware, and that can be moved to, or instantiated in, various locations in the network as required, without the need for installation of new equipment.

In the hardware appliance model, all of the functionality to deliver a service is resident in the appliance and the resulting management of multiple appliances is cumbersome and expensive. In the NFV model all traffic is back hauled to a data center where middle box applications running on virtual machines deliver the functionality that is the service to the end customer. Previous NFV models, however, are inefficient in that all traffic is routed through a data center.

Software-defined CPE is hybrid solution that optimizes service deployment. Functionality that is more optimally run in a hardware appliance may be run in that appliance and functionality that is more optimal to run on a virtual machine is run on that virtual machine. Software-defined CPE is a flexible framework that leverages software defined networking and virtualization to deliver services quickly and at lower cost. Software-defined CPE may use co-operative cloud processing, and may typically be open, flexible, multi-tenant, and quick to update.

Software-defined CPE splits the control plane and the forwarding plane using software defined networking protocols (OpenFlow) but also optimizes the interaction between the control plane and forwarding plane.

Some middle box applications are more efficient to run in the NFV model and some functions are better suited for the hardware appliance on CPE. NAT, Firewall, network access control, session boarder controller, routing, wireless access point management are all services that are CPE centric. Web proxy services on the other hand may be more efficiently run as an application on a virtual machine in the data center.

This leads to two additional problems. First, any traffic that needs to go through an application running in the data center needs to be segmented out at the CPE device and forwarded to the data center and any return traffic needs to follow a path back through the middle box application in the data center. The solution to this problem is to use flows and OpenFlow tables to direct traffic as necessary. This means that each flow type must be identified, classified, and then have an appropriate policy applied. The addition of software defined networking through OpenFlow to the CPE device makes the NFV model more efficient by forwarding only the required traffic to the data center.

In order to make the CPE based services more efficient the processing of the services can be offloaded to the data center. In cases such as mean opinion score (MOS) scoring to measure voice or video call quality or middle box services such as intrusion detection system (IDS)/intrusion prevention system (IPS), packet headers can be forwarded to the application running in the data center such that the CPE device 26 does not have to burdened with running the algorithm for MOS or the IDS/IPS. If the situation warrants, all packets could be duplicated and/or the originals packets in a designated flow could be routed to through the algorithm. When a packet arrives at the physical CPE hardware appliance 26, the software in the CPE checks to see if a rule exists on what to do with the flow associated with that packet. If a rule exists then the flow is handled in accordance with the rule set.

If a rule set does not exist, then either the CPE 26 identifies what the packet is or the packet is forwarded to the data center 30 for classification. Once the packet is classified, then the appropriate flow rule set is calculated and result is stored in the virtual CPE instance as well as promulgated to the physical CPE device 26. If the flow is something that requires continuous inspection for the generation of flow statistics like MOS or other middle box functions, then just the packet headers are duplicated or forwarded to the MOS application running in the data center or the other middle box function running in the data center. This offload technique of using packet headers is applicable to any service that uses packet statistics for traffic analysis, quality analysis, or many middle box functions that require deep packet inspection.

Figure 2:
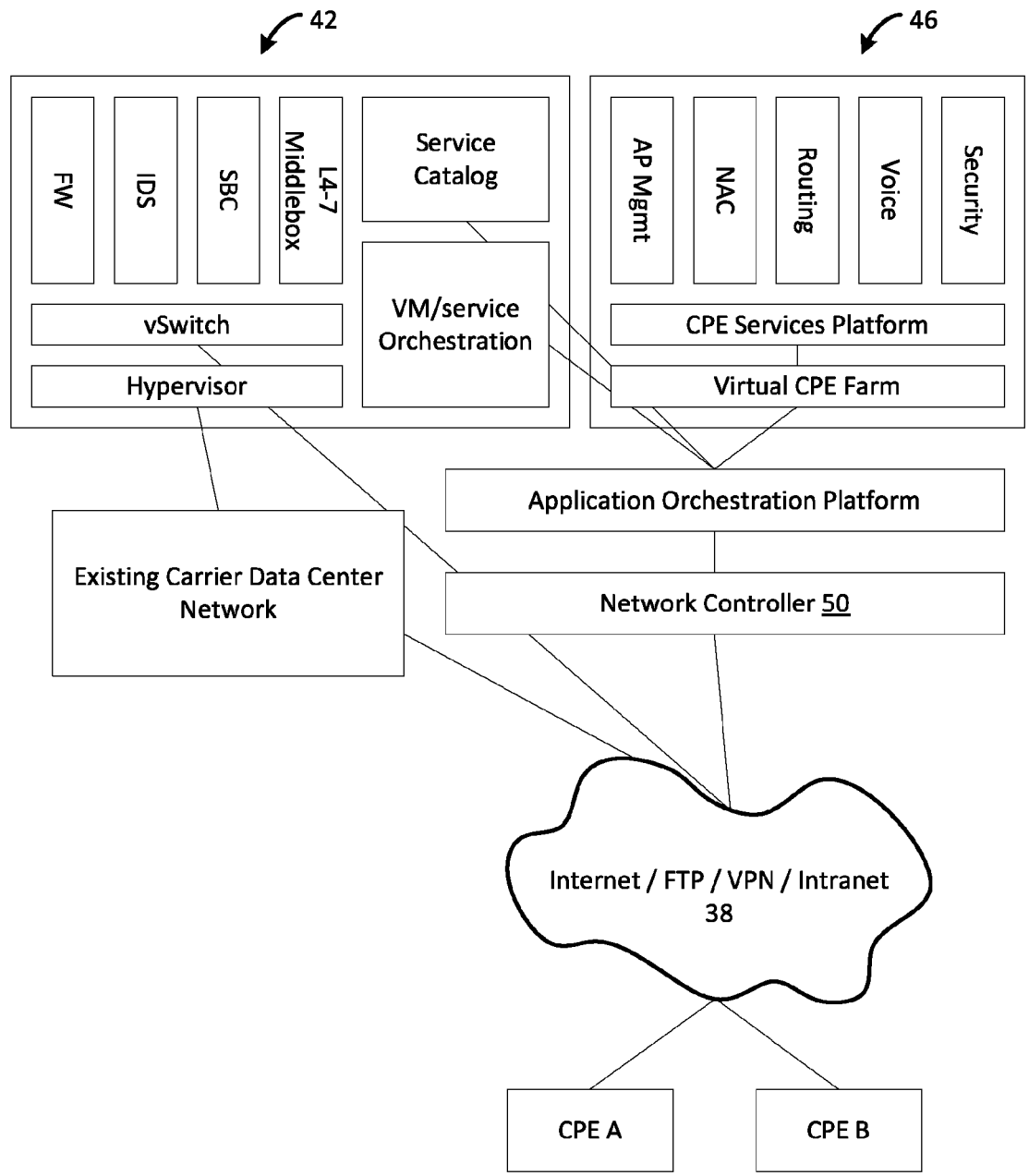
FIG. 2 is a schematic illustrating aspects of the computer system.

In addition, in order to maximize the throughput of the hardware appliance, a split processing model may be utilized. FIG. 2 illustrates this at a high level. The upper left side 42 of FIG. 2 shows third party applications running in a virtual environment (i.e. on vendor computer 30). The software-defined CPE forwards traffic to these third party applications as required. The upper right side 46 of FIG. 2 shows the set of applications that are resident as CPE-based services and also depicts the split processing model. In the split processing model, flow rules are used to start, stop, and modify flows, but the rules are only updated where it is necessary. This is done by modeling the state of the physical CPE 26 and storing it in the virtual environment 30. When an update to the state of the physical CPE 26 is necessary, a looping software process that contains the update rule set is used to calculate the necessary changes which are then used to update the virtual state model as well as modify the flow tables in the physical device.

As a result, the amount of bandwidth consumed by the control channel as well as the latency introduced by making forwarding decisions in the data center is reduced. When a packet arrives at the physical CPE device 26 it is identified by its source IP address, source port, transport protocol, higher level protocol, and, if desired, cryptographic identification. The physical CPE blocks the flow from proceeding until a flow rule set is located that allows the flow to proceed. The flow rule could be cached in the physical CPE device, or the physical CPE device may have to request a rule from the virtual CPE running in the data center 30. So the software-defined CPE may first provide network access control. Every flow may have a rule set associated with it and that rule set can be controlled via policy.

The generation and storage of this rule set and the modeling of physical CPE virtually by storing state is unique. The rule set represents the state of a given flow at a point in time. The rule set is updated by a software process that runs as a continuous loop on an off-board processor such as in computer 30. This off-board processor could be a processor in an appliance in a service provider's point of presence, it could be a processor running on a blade server, or it could be a virtual machine. When the rule set is in need of an update the appropriate rules process is fed the information pertaining to a data packet to generate the update and the output is used to modify the rule set. This new rule set is then stored in the virtual CPE instance and is also sent to the physical CPE. The physical CPE then uses that rule set for that flow until either a timer expires, the flow terminates, or the rule set requires updating.

An example is the session initiation protocol (SIP) application-level gateway (ALG) necessary to preform SIP network address translation (NAT) on the CPE device. In the physical appliance model, the SIP ALG runs natively on the device. This entails identifying different types of traffic, copying the SIP traffic to the ALG where it is parsed, a rule set is invoked to identify needed modifications, modifications are performed and SIP traffic is forwarded. In the case of SIP, an INVITE is a dialog-creating event and has state associated with it. The SIP ALG maintains the state of what modifications should be performed on a given dialog. However, the ALG computes this continuously which creates an unnecessary continuous load on the CPU of the CPE 26. In addition, changes to the ALG rule set require a code update to the firmware on the appliance. If only one appliance in a deployment of thousands of devices requires this rule update, a managed service provider must certify and update all devices to avoid have many different instances of software running with different characteristics.

In the software-defined CPE model, the processing is split between the physical hardware appliance on CPE 26 and a virtualized environment on computer 30. The SIP parser or partial SIP parser still runs on the CPE device although it may also be run in an off board process on computer 30. The ability to modify the SIP protocol may still run on the CPE device. The rules for modifying SIP messages and the rules engine runs in an off-board process on computer 30. This allows the rules to be updated independent of the firmware on the physical hardware appliance and allows faster processing as well as independent rules for each CPE instance.

The different processes in the physical CPE 26 are modeled as the state of the CPE and stored as such in virtual CPE environment on computer 30. So, in the case of a SIP dialog initiation, the physical CPE device classifies the flow or sends the flow to an off board process for classification. This classification is accomplished by inspecting the packet headers and may be performed either with hardware assist or via software on the physical CPE device or similarly in an off board process on computer 30. Once the flow is classified as a SIP flow, a SIP parser again either running with hardware assist, in software on the physical CPE or in an off board process classifies the message as an INVITE with session description protocol (SDP).

The parsing function also ensures that the message is properly formatted. The message is then put through a series of flow tables that contain the rules to match source IP, source port, and the information in the From header. If necessary, the identity is confirmed using RFC 3325, 4474 in order to ensure that the user has the authority to send and INVITE and to determine if any special rules such as logging or recording are required. If an existing flow table entry has the necessary rules for modifying the INVITE and SDP, those rules are invoked and the modification made. If an existing flow table entry does not contain the necessary rules, a request is made to the virtual environment 30 where the rules engine computes the necessary rules/changes to the rules tables. This change is then stored as state in the virtual environment 30 and a flow table update is transmitted to the physical hardware appliance 26. The state in the virtual environment 30 represents the physical CPE 26 at a point in time and the state is updated as necessary. This changes a compute problem into a storage problem.

The physical CPE 26 in the software-defined CPE model can also send packets that it cannot identify or where it is more efficient to identify the packet in the off-board processor 30. For example, it is not necessary to run a SIP parser or partial SIP ALG on the physical CPE. The INVITE packet(s) can be sent to an application running in the off-board environment that performs the functions described above. In this case, all that the CPE 26 retains is a cached rule set for a flow and all identification, manipulation, and rules computation is done in the off-board processor. The storage of the state of the flows in the virtual CPE is identical in either case.

Likewise, if a SIP INVITE is received from outside the CPE, the CPE will forward the information to the virtual environment where the rules engine will determine what to do. This will update the state of the CPE 26 in the virtual environment 30 as well as the state of the flow table in the physical appliance environment. This same concept holds true for routing, all other ALG functions, IDS/IPS functions, firewall functions, network access control and wireless access point management and control as examples.

The flow table updates to the physical appliance take place through the OpenFlow protocol and as an extension of the OpenFlow protocol including updates through the CPE management channel.

In a deployment with millions of CPE devices, each CPE device can be treated as a virtual CPE instance that is modeled as state and, as a result, policies can be applied to each of the virtual instances separate from any other instance.

An additional benefit of this architecture is that the centralized logic allows the system to learn from an individual device. For example if CPE1 was providing SIP trunking for PBX1 and the customer upgraded software of PBX1, resulting in interoperability problems, then the system can collect the signature associated with the signaling of this event, and when a patch is available that patch can be inserted into the rules. Then if PBX2 behind CPE2 is updated to the same firmware release as PBX1, the system has the signature and can apply the patch to CPE2. In this manner, patches are applied only where they are needed.

In addition, the concept of flow tables and using a central rules engine that updates flow table to control and manipulate packet flows on CPE also allows for faster patching of interoperability issues or resolution to security threats. The physical CPE 26 will block a flow that is not in its flow tables. This inherently provides a firewall function. It then formats a request that contains the output of the protocol decomposition engine (parser) and sends it to the virtual services environment. The virtual services environment will attempt to generate a rule in the form of a flow table update that can be sent to both the virtual CPE 30 and physical CPE 26. If the virtual services environment cannot generate a rule because the input is unknown, then the virtual services environment will store the output of the CPE as a signature.

A set of templates is used in the virtual services environment to generate the flow table updates. These templates represent the desired action in man readable format to be taken for the collected signature. When a new signature is acquired an administrator can use the template to define the desired result which programs the virtual services environment to take the required action. For example if a SIP INVITE arrived from a recently upgraded phone or a new phone and that INVITE contains a header that isn't in the flow table on physical CPE, it is likely that the virtual services environment cannot generate a flow table update. A signature of that INVITE is then generated, and the system creates an alarm. The administrator can then log in and access a template that shows all of the known fields in a SIP INVITE message including areas where free form data is allowed. The administrator can fill in those fields with appropriate values. This template is then stored and the virtual services environment is now programmed to take the actions listed in the template any time that signature is detected.

These templates can be applied to messages exiting the physical CPE 26 on any interface. If the template does not contain the necessary fields to make the desired modification then a template generator can be accessed to create a new template with the necessary fields. This capability significantly reduces the cost of deploying managed services where interoperability is an issue. When something doesn't work in today's system, the end user contacts the managed service provider, the managed service provider must trouble shoot and escalate to the equipment supplier, the equipment supplier must trouble shoot and escalate to engineering, engineering must supply and test a fix, that fix is then tested by the managed service provider, and finally deployed on the CPE box for the end user. In the present system the managed service provider can simply modify a template, test it, and load it into the virtual services environment and the problem is resolved. In addition, the system as a whole now has the signature and related fix.

This is also useful for disaster recovery or movement of CPE, as the state of the CPE 26 stored in the virtual environment 30 can be used to update a different physical device as a new CPE. For example, if one wished to have a "follow the sun" call center, the new physical location could be brought on line by simply downloading the state of CPE in the current location and applying this state to the new CPE in the new location. Once the new location has taken over all calls, then the old location could be shut down.

For high availability, the stored state of the CPE 26 is replicated through a distributed data base model and multiple instances of the virtual environment are run simultaneously. As the CPE 26 is multi-homed, the CPE continues to communicate with the other instance(s) if a virtual instance fails.

To perform a software upgrade of a virtual environment 30, the new software is installed and started, and the state of the virtual CPE as well as the configuration state and the state of the system are all copied from the running instance to the new instance. The new instance(s) is added to the homing of the physical CPE 26 and then the CPE is switched or failed over to the new instance(s). Once all physical CPE have been homed onto the new software, the old version is shut down.

In the case of failure of the virtual environment 30, with traffic being run through a middle box application in that virtual environment, the normal route updates will cause traffic to be rerouted to the running environment(s). However, as the physical CPE is multi-homed and can detect almost immediately the loss of a virtual environment, it will route traffic to one of the running environments which can significantly shorten route convergence time.

In addition, for end customers that are concerned about loss of connectivity to the control plane, either through WAN failure or data center outage causing a complete loss of service, the physical CPE device 26 can optionally be deployed with a "survivability option". This mode of operation would be entered when the physical CPE 26 loses connectivity with the virtual environment 30. In this case, the physical CPE runs a reduced feature set on its CPU. Basic routing, voice or video calling, and other basic networking needs are met. When the virtual environment 30 is restored, the physical CPE 26 reverts to the split mode of processing.

Failure is detected by loss of L1 through L7. (Where L1 represents the physical layer, L2 represents the data link layer, L3 represents the network layer, L4 represents the transport layer, L5 represents the session layer, L6 represents the presentation layer, and L7 represents the application layer) The physical CPE hardware is monitored for L1 and L2 failures. If a failure at this level is determined, then the CPE fails over to its survivability mode of operation. If L1 and L2 are available, then the algorithm uses L3-L7 messages to determine availability. If the physical CPE is passing traffic, then it must be communicating periodically with both the network controller 50, the management controller, and the data path controller shown in FIG. 2. The network communications broker in FIG. 2 is responsible for the encapsulation/decapsulation tunnel as well as moving traffic to and from the various controllers. If L1 & L2 are available, the survivability algorithm checks L3 through ICMP or other layer 3 protocols, and tunnel availability by communicating with the network communications broker. The management controller is responsible for knowing the state of the system. It knows which applications are available and which are not. It reports application availability to the physical CPE devices 26. The physical CPE devices store the application availability in a system state table.

In this manner the CPE can have multiple variants of survivability mode. If only one application is not available then that single application can be started in survivability mode of operation in the physical CPE box 26. If multiple applications are not available, then the applicable applications can be stated in survivability mode. If the network communication broker or any of the controllers are not available, then the physical CPE fails over into complete survivability mode of operation. The network communications broker will send a failure message to CPE if it loses communication with a controller. Even in a multi-homed high availability deployment, if all network communication brokers report to physical CPE controller unavailability, then the CPE will fail over to survivability mode of operation.

If the physical CPE box 26 is not passing traffic, then it periodically checks the health of the system by initiating communication with the network communications broker and the management controller.

Restoration of the physical CPE 26 to split mode processing involves the CPE detecting availability of the virtual environment 30 and the virtual environment notifying the CPE of availability. The physical CPE hardware reports L1/L2 availability, and for layers 3-7 the physical CPE will attempt layer 3 requests periodically. The amount of service availability in a survivability mode corresponds to the amount of network availability. If an upstream route is available but the virtual environment 30 is not, then the physical CPE 26 has a network connection and the services are limited by the software contained in the physical CPE. When the network communications broker is restored, it notifies the physical CPE 26 to initiate the register sequence with the network communications broker. The network communications broker does so using an algorithm that prevents all physical CPE 26 from attempting to register simultaneously and causing overload. Once the physical CPE 26 is reconnected to the network communications broker, the physical CPE 26 asks the management controller for application availability to update its system application state table and transmits the CPE state so it can be stored the virtual environment 30. To prevent cycling of the physical CPE between split mode and survivability mode on reoccurring intermittent failures timers are used to back off the restoration attempts.

Figure 3:
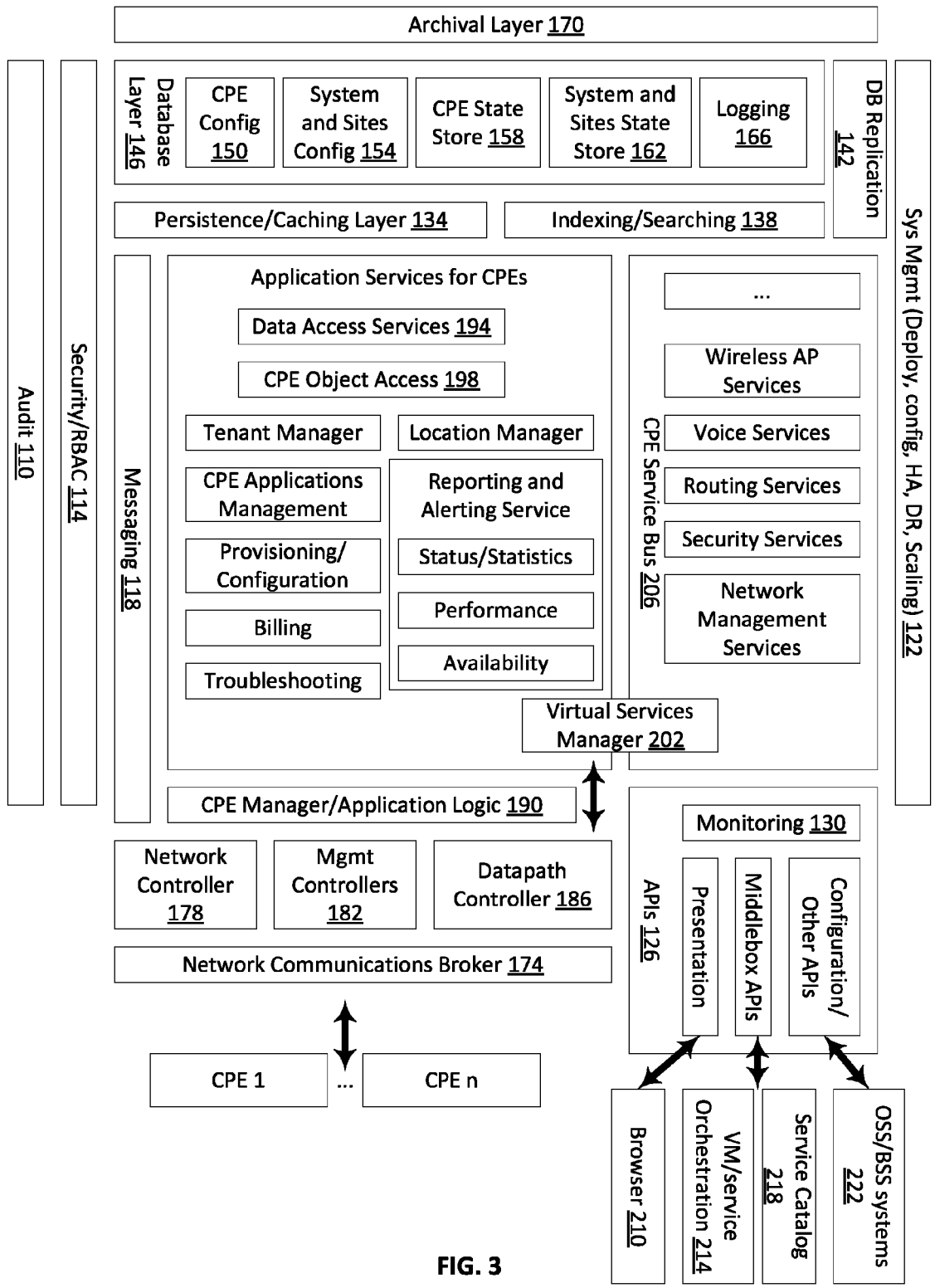
FIG. 3 is a schematic illustrating functional architecture of software defined customer premises equipment.
Figure 4:
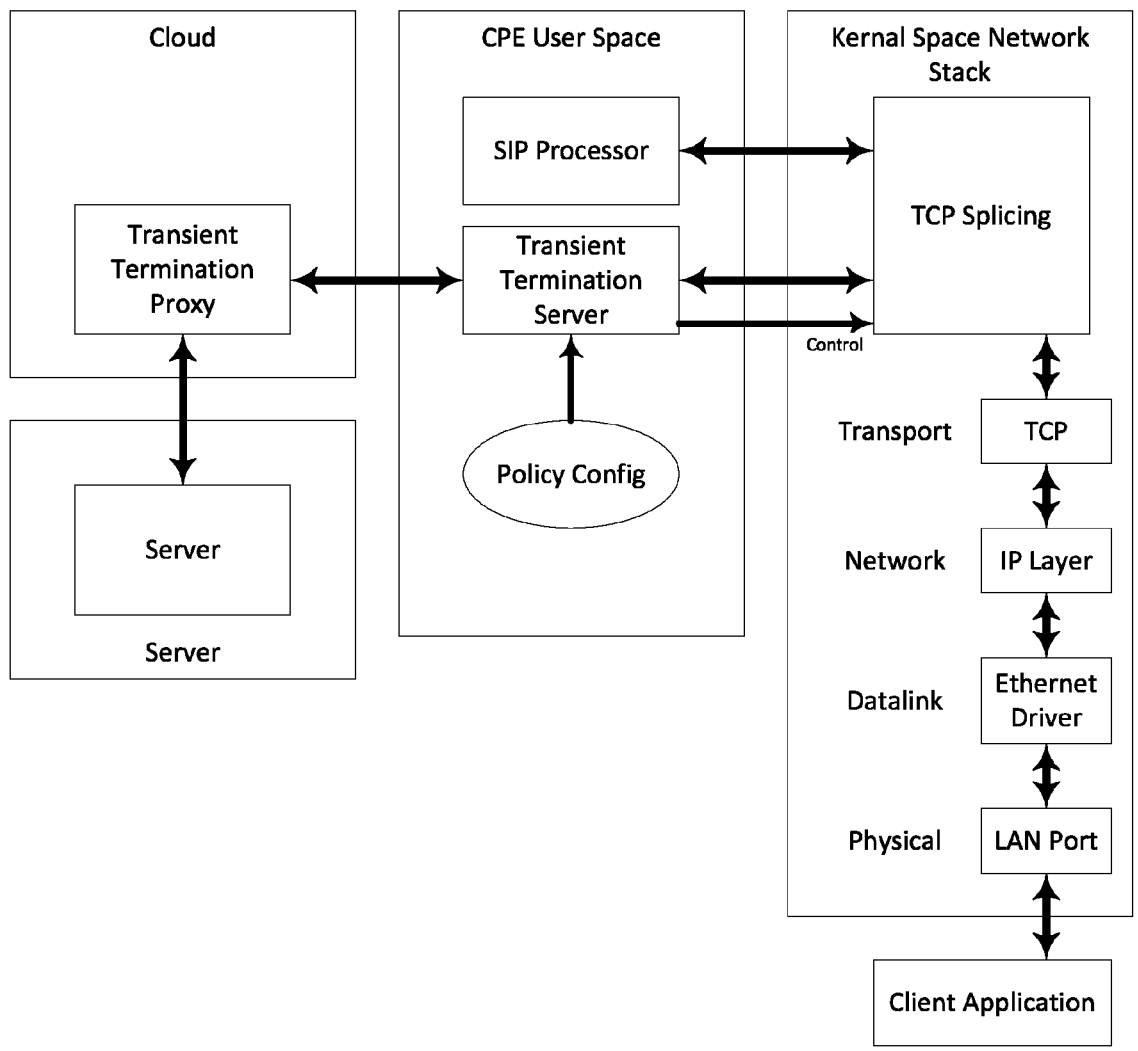
FIG. 4 is a schematic illustrating aspects of the computer system.
Figure 5:
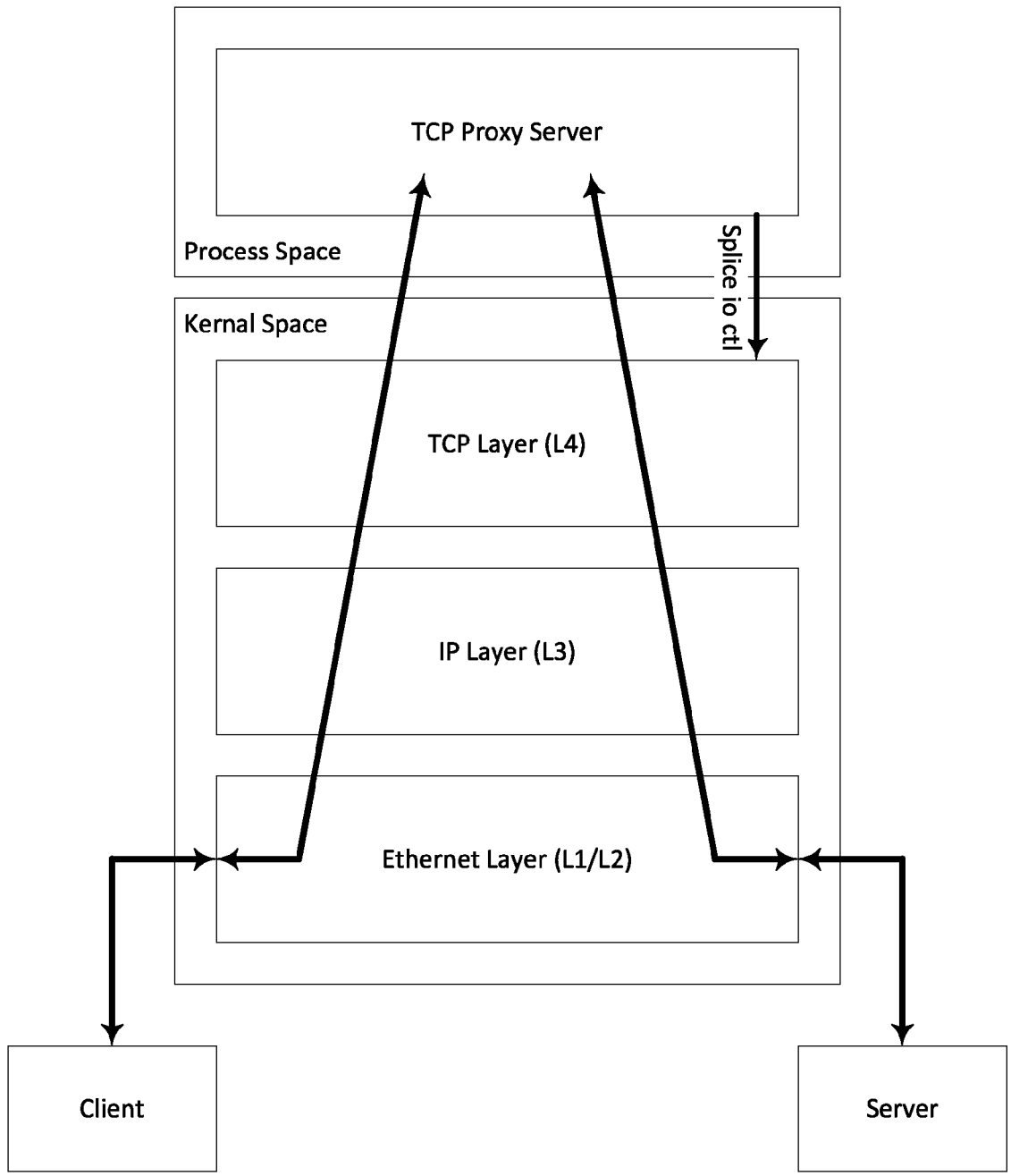
FIGS. 5 and 6 are schematics illustrating data transfer as may be used by the computer system.
Figure 6:
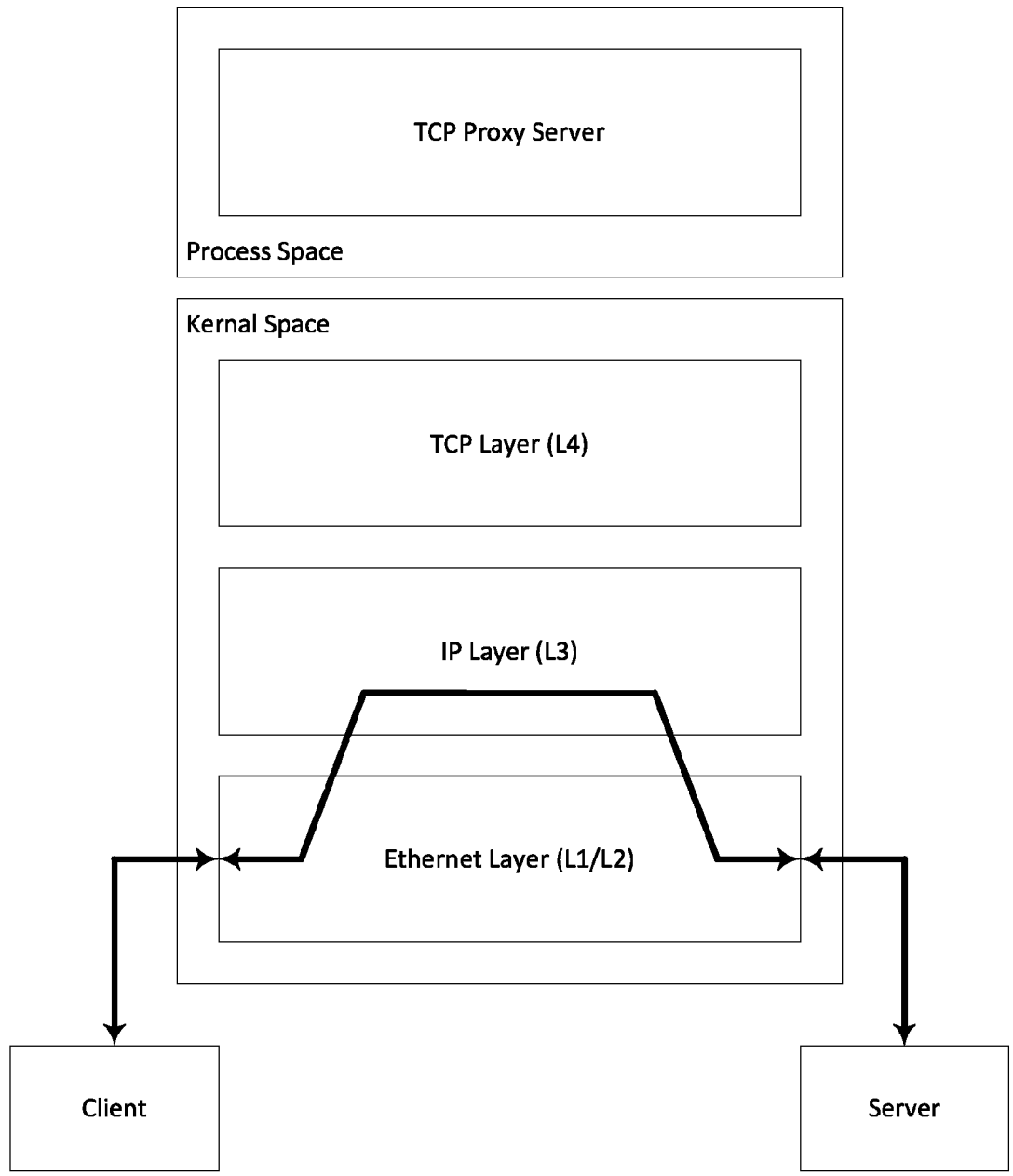

FIG. 3 depicts the functional architecture of the software-defined CPE. The following is a high level functional description of each of the elements.

Components

A. Cloud Platform Harness

Audit 110: Provides a running log of all operations on platform for compliance and security requirements.

Security/RBAC 114 provides role-based controls to ensure that only the appropriate people perform the appropriate functions on the system. Security 114 is also responsible for password management, attacks from external entities (password guessing), etc. Security 1124 is also responsible for integrating with potential LDAP or SQL system stores for SP's user databases. RBAC will typically be across two levels of tenancy—first SP, and then the end-organization.

Messaging 118 provides a queue-based management system that allows interlayer or inter-component communication in a scalable and reliable manner. Messaging layer is reliable and provides HA as well as persistence.

System Management 122 consists of the logic to handle disaster recovery, high availability, the deployment of the product itself, system configuration, auto-scaling, system health if relevant (might be broken into different pieces)

API 126 may provide a data-driven API to manage multiple different client presentation layers (most likely JSON-based RESTful API). The API may include Middlebox APIs which allow for communication and coordination with external middlebox functions such as IPS, IDS, Web Proxies, including load-balancing, scaling, instantiation. This could also work both ways and the EW might be asked to perform the functions of load balancing, load monitoring, etc. or the orchestration layer might take on those tasks. Monitoring 130 provides visibility into the internal statistics of the various components, including queue lengths, response times, health, etc. and may validate the health and external performance elements of the system. Configuration/Other APIs may provide APIs for OSS systems to configure and interact with the overall system.

B. Database Elements

A Persistence/Caching Layer 134 provides logic that figures out how to store information in the database and provides caching if needed for frequently accessed objects. Indexing/Search 138 provides search augmentation for database objects to provide free-text or intelligent searches of objects within the system such as CPEs, sites, users, and potentially flows as well. All of the appropriate scopes should be respected for RBAC. The Indexing/Search handles the semantics of a working set of results. DB replication 142 handles replication for the databases.

A database layer 146 may include the following databases: CPE config 150 holds the configuration of all the CPEs, and may be versioned. System and Sites configuration 154 holds the configuration of the cloud system 30, all the necessary config files, and site information, and may be versioned. CPE state store 158 stores a live state of the CPE devices 26, including flow information statistics as well as relevant state table entries for any protocol elements that are running on the CPE (essentially vCPE state). System and sites state store 162 stores state and other running information of the system as well as relevant configuration information, including any statistics. Logging 166 logs data for the system. Different modules may all log into a single logging table that may provide ability to index and search the logs (via the indexing layer 138). An Archival Layer 170 may provide a module to pull information into archives for subsequent storage.

C. CPE Communication Elements

A Network Communications Broker 174 may provide messaging and communications that manages all connections with multiple CPEs 26. The Network Communications Broker handles optimization, prioritization, compression, as well as connection security, health etc.

Network Controller 178 provides flow and access-based controls on the CPE. This may be an openflow++ portion of the design. A Management controller 182 pay provide real-time and slow-time, configuration, upgrade, systems, status, monitoring, troubleshooting, and provisioning of the CPE. The Network Controller 178 may provide a TR-69 mechanism/NetFlow collector and use that as kind of record to update the representation of state—management data on flows—standardized mechanism. A Datapath controller 186 may manage communication of datapath into the virtual CPE services bus. CPE Manager 190 manages the functions on the CPE with regard to configuration/OAM, certificate management, as well as network controller functions.

D. CPE Application Logic

Data Access Services 194 provides abstraction layer to the persistence and database backend as appropriate. IF the system includes multiple stores, this manages the appropriate aspects of it, also invokes optionally the indexing and search services as necessary. CPE Object Access 198 provides the CPE object models abstraction for the different services, protects changes in the underlying storage methods (state, config elements) from the upper-level access methods.

The CPE application logic may also provide the following managers:

A Tenant Manager manages the different tenants on the system and provides visibility into which tenants the CPEs belong to. There will typically be at least two level of tenancy: for end-user customer and for the service providers. A Location Manager manages the locations of the different CPEs and the appropriate hierarchy. A CPE Applications Management manages the applications that run on each of the virtual CPEs—e.g. routing services, firewall services. Rights of the tenants to access each of the services will also typically be embedded within this component. The Applications management may interact with billing to ensure that customers are appropriately billed for services used.

A Provisioning/Configuration manager handles the provisioning and configuration of each individual CPE 26, getting them to the appropriate firmware build and configuration files. Integration with OSS systems is managed by this component as well. A Billing manager monitors any billable components of the system, and captures appropriate information for subsequent integration with external BSS systems. A Troubleshooting component provides appropriate visibility services to either browser UI or CPE requests for troubleshooting. The troubleshooting component also handles permissions-based granting of temporary troubleshooting privileges to support staff (i.e. customer can provide temporary super-user/logged rights for support to come in).

Reporting and Alerting Services may provide a component for handling reporting, status and alerting based on thresholds or other alarms. Since this component manages the sub-services for availability, statistics and performance, it has the necessary visibility into setting up alerts as needed. Availability tracks the availability for each of the CPEs in the system. Status/Statistics tracks the status and key statistics of the CPEs in the system. This will typically either be timer/loop driven from the head-end or event driven from the CPE side, with the former preferred to ensure consistent health checking Performance tracks the performance attributes of the CPE in terms of B/W utilization, compute, CPU cycles, memory etc.

A Virtual Services Manager 202 is a component that coordinates with the CPE service bus; coordinating which vCPE instances will run which services in what order, and ensure that as events come in, that they are appropriately routed to the appropriate CPE service.

E. CPE Service Bus

A CPE Service Bus 206 may include the following services: Voice Services is a collection of services that deal with voice traffic such as SIP proxies or SBCs or SIP trunking capabilities. This service typically includes MOS scoring or other VoIP-based capabilities. Routing Services provides routing services that will run as a proxy for the end-point CPE, including protocols such as BGP, OSPF, RIP. Security Services provides security services such as NAT and firewall, or IDS. Network Management Services provides management of local wired networks, including functions such as network access control or network partitioning for compliance purposes (e.g. HIPAA, PCI compliance via VLAN management). Wireless Management Services provides capabilities for managing wireless APs at edge locations, may include basic services for Edgewater or white-label APs and OEMed/3rd-party solutions for branded AP management.

F. External Elements

The system may interact with various external elements such as a web Browser 210 which may allow administrators to interact with the system. A VM/service orchestration element 214 may provide either (a) functions that return necessary network configuration based on request for a specific resource from the service catalog (with tenant and CPE context) or (b) functions that are used to call into to provision new services with the administrator of the remote system 30 figuring out how to spin up instances of virtual services. In (a), the orchestration module takes care of load-balancing, load-leveling etc. while in (b), the administrator of the remote system 30 will be expected to handle those functions. A Service catalog 218 may include a list of appropriate external middlebox services that are available for the CPEs to connect to. An OSS/BSS integration module 222 allows communication with the in-house OSS/BSS systems for configuration, provisioning, monitoring, reporting and billing.

Threat Management

As discussed above, the system is particularly adapted to providing unified threat management. Unified Threat Management (UTM) may provide a comprehensive security solution by providing network firewalling, network intrusion prevention, gateway antivirus, gateway anti-spam, VPN, content filtering, load balancing, data leak prevention, and reporting. Providing threat management may significantly increase the burden on a gateway computer 26. The type and nature of security threats have increased with bandwidth and network utilization. As a result, it becomes increasingly difficult to maintain a gateway computer 26 which is capable of providing threat management and network/internet access while maintaining throughput speed at a cost effective price.

The following components or modules may be utilized in an exemplary system which may function as a UTM system.

UTM Executive

Network Interfaces

One or more physical network interfaces (LAN or WAN) may be utilized. The interfaces may support Ethernet via the core CPE hardware or other types of interface (ATM or DSL) via optional daughter boards.

vSwitch

The vSwitch is a Software Switch and is a production quality, multilayer virtual switch. vSwitch can operate both as a soft switch running within the hypervisor, and as the control stack for switching silicon. When deployed on the CPE, it is used as the control stack for the switching silicon and exposes the control capabilities using an OpenFlow compliant API.

Linux Networking Stack

All the UTM components integrate with the Linux Networking Stack, which provides basic L2/L3 switching and routing capabilities for the system.

OpenFlow API

Control of the switching silicon is achieved using the Open Flow API, supported by vSwitch or via a natively OpenFlow implementation that sits on top of the switching silicon and supplied by the switching silicon vendor.

OpenFlow Controller (CPE Local or Cloud)

The OPF Controller presents an API (called the Northbound Interface) for the UTM system that allows flows to be added, modified and removed from the switching layer. It also provides a query interface that can be used to query system capabilities, gather statistics etc.

Quality of Service (QoS) Layer

The CPE supports traffic shaping (rate limiting), packet scheduling algorithms and congestion avoidance using queue management techniques such as RED and WRED. Additionally, the CPE supports Differentiated Service by setting the DiffServ field in the IP header for packet classification purposes. QoS capabilities may be implemented by functions inherent in the Linux networking stack. Alternatively, QoS functions may be implemented by OpenFlow, which has a rich API for packet queuing.

Transient Termination Service (CPE Local)

This component may also be referred to as the Connection-oriented Traffic Classifier and it provides a temporary endpoint for TCP connections initiated by client applications. Together with the DPI engine, it allows the CPE to accurately classify application protocols and apply the policy-driven traffic handling strategy.

Connectionless Traffic Classifier (CPE Local)

Sitting alongside the Transient Termination Service, this component provides protocol traffic classification for connectionless (non TCP) traffic, such as ICMP and UDP traffic.

Deep Packet Inspection (DPI) (CPE Local or Cloud)

The DPI engine inspects the traffic sent between client and server applications and uses the information in the packets to classify the application protocol. DPI is also used to parse headers, URIs and other pertinent fields from the data stream.

Malware Scanning Engine (Cloud)

The cloud-hosted Malware Scanning Engine is used when the policy indicates that cloud-based malware scanning of the application payload is required.

TCP Connection Splicing (CPE Local & Cloud)

In cases where the handling policy dictates that the CPE should processing the application traffic using local fast-path, the UTM module on the CPE uses the TCP Connection Splicing function to join the client's TCP connection to the server's TCP connection and remove itself from the packet path entirely. After splicing, data packets sent between client and server are handled by the IP layer within the Linux kernel.

Policy Decision Point (CPE Local)

The CPE Policy Decision Point (PDP) processes policy requests on behalf of the UTM module and returns a policy response containing an action (permit or deny) and optionally attributes that specify parameters such as timeouts, QoS, ToS, or other similar session parameters for the UTM to enforce.

To improve processing efficiency, the CPE PDP maintains an in-memory cache of policies that are checked against each Policy Request. When a request is received, the PDP checks the cache to see if any policies match the application protocol. If the cache does not contain a matching policy, the PDP asks the Policy Server in the cloud whether it can supply any applicable policies that match the application protocol. The PDP adds the new policies to the cache and then evaluates the policy decision.

Policy Server (Cloud)

If the CPE's policy cache does not contain a policy that matches the application protocol, then PDP asks the Policy Server in the cloud whether it can supply any applicable policies that match the application protocol.

In order for a DPI package to classify traffic it must examine several packets in a flow; typically between 4 to 7. For an IPS system the entire flow may be monitored. For AV or data leak prevention files that are transferred via FTP, SMTP, POP3, or other data transfer mechanism need to be scanned in their entirety. As a result UTM devices typically perform 2 functions on connection oriented traffic like TCP. They delay binding such that the first data packet from the client can be examined before it is sent to the server and if a flow is not deemed to be a threat the traffic is spliced to a fast path where it is no longer inspected.

TCP splicing is a technique to splice two connections inside the kernel, so that data relaying between the two connections can be run at near router speeds. This technique can be used to speed up layer-7 switching, web proxy and application firewall running in the user space. The TCP splicing module handles fix ups of TCP sequence numbers, copying of data within the IP layer of the kernel, resolves mismatched MTU and timeout settings for the two separate TCP connections that are spliced together.

The system may include two splices and one splice may span from the CPE to the cloud. A first splice is performed on CPE. We delay the TCP binding on CPE by emulating the server for the connection oriented handshake plus the first data packet. Once the flow has been classified as a result, policy can be applied. If the policy is anything other than "monitor local" (i.e. keep the flow going through the DPI module on the CPE), TCP splicing is used. For the policy action "local fast path" the splice is used to remove the flow from user space which consumes more CPU and insert it into kernel space which is more efficient. If the policy action is "proxy cloud" then an out of channel message is sent to the SW in cloud. These messages contain the information (destination IP address, destination port, protocol, and 1st data packet) so that cloud SW can emulate the client that is on the protected side of the CPE to the server. In the case of TCP, the cloud SW sends a SYN to the server that the client on protected side of the CPE sent. The server will then respond with a SYN/ACK. The cloud SW will respond with an ACK and then the first data packet. The traffic flowing through the CPE doesn't need to be in user space as there isn't any application level work being done. The traffic needs to be moved through the CPE in the most efficient way possible and, as a result, a splice is done in CPE to move the traffic out of user space. Likewise, the traffic running between the cloud SW and the CPE can also be spliced to optimize its throughput.

A transparent proxy may be utilized by terminating a connection by delaying the binding to the requested server until enough information can be gathered to make a decision and then originating the connection to the server. A split transparent proxy places the halves of the transparent proxy in two different locations. A split transparent proxy moves connection oriented traffic to a vendor computer 30 such as the cloud where additional resource is available. In this fashion the cloud/vendor computer 30 also has the state of the CPE 26 stored. This becomes useful for other things i.e. routing, VoIP, failover, etc.

Additionally, this part of the system optimizes where computation and storage occur. The decision is inserted through the policy API into the transient termination handler SW module. An adaptive algorithm measures CPE CPU, bandwidth consumed, and storage consumed. The adaptive algorithm "knows" the capability of the CPE 26 (i.e. are the necessary SW modules to do any task available on the CPE 26 or are some of them located externally). If the necessary SW modules are available on the CPE 26 and the CPE load metric is below a threshold then the function is performed locally. If the load metric is above threshold then the function is performed externally, i.e. on computer 30. This optimizes where compute occurs as load is distributed to wherever there is available computation resources.

The decision on where to compute or store is made by the combination of the 3 parameters plus heuristics. For example, voice calls follow a specific pattern throughout the day in a typical office. A call center will typically have a different pattern of voice calls throughout the day. So, the algorithm takes the statistics into account when the compute local or compute external decision is made. For example, if the CPE 26 is below threshold but it is 12:59 and stats show that call volume picks up materially at 13:00, the algorithm would offload a new flow starting at 12:59 to the cloud 30 in anticipation of load increasing at 13:00. If load does not increase as expected, a decision regarding flow at 13:30 may be made differently.

The CPE heuristics are represented by a parameter that is computed in the cloud (i.e. vendor computer 30) for that CPE 26 and that is updated as CPE state changes. As the cloud can store the traffic statistics for a given CPE over a long period of time it can "learn" what is the expected behavior is for that device. This also provides an additional form of security for the CPE 26 and system 14 as "normal" behavior is now mapped and can be compared to current behavior. If the current behavior of the CPE 26/system 14 is not "normal" behavior then the system can alert.

The transient termination software is a key module in controlling what happens to traffic.

A summary of the sequence of operations for classifying and handing TCP-based flows is:

Software defined networking control such as OpenFlow is configured to rewrite the IP headers and forward all TCP-based traffic from each LAN interface to a defined TCP port.

A user-space process called the Transient Termination Server, is listening on this port and its accept( ) call is unblocked whenever a new TCP connection is established.

The Transient Termination Server receives make a connect( ) call using a new socket to terminate the connection.

Masquerading as the server, the Transient Termination Server reads application payload sent by the client and sends the data to the DPI engine for classification.

In some cases, the protocol can be identified from the client data stream within the first few packets. In other cases, the server data stream is needed to classify the protocol.

Once the protocol has been classified, the Transient Termination server looks up the handling policy configured by the administrator from the policy cache in the CPE. If no policy is defined, the CPE can request one from the cloud.

If the policy indicates the data should be handled by the fast-path, then the Transient Termination Server in the CPE creates a new TCP connection to the server, sends all application data received from the client to the server, and invokes an ioctl( ) call to splice the client's TCP connection and server TCP connection. At this point the Transient Termination Server has removed itself from the connection.

If the policy indicates the application payload data should be sent to the cloud for malware inspection, then the Transient Termination Server sends a control plane message to its peer in the cloud, to request that it establishes a connection to the server. The Transient Termination Server remains interposed in the conversation between the client and the server.

In one example, all application level data received from the client is sent to a user space process called the Transient Termination Server. The Transient Termination Server uses a Deep Packet Inspection engine to attempt to classify the application protocol by inspecting the application payload. Classification is usually possible within the first 3-7 packets of the conversation, including the three-way TCP handshake.

When a client application attempts to connect to a server machine, OpenFlow rewrites the IP header of the SYN packet with the IP address and port of the Transient Termination Server and forwards the SYN packet to the CPE's Linux stack. The Linux stack completes the three-way TCP handshake. The Transient Termination Server is notified via the accept( ) call that a new connection has been established.

The Transient Termination Server recovers the port information from the original TCP connection request and sends a message to the Transient Termination proxy in the cloud. The Transient Termination proxy in the cloud establishes a second TCP connection to the destination server. This step is necessary so that we can classify protocols like FTP where the first application data is sent from server to client rather than from client to server. The Transient Termination system relies on a Kernel Loadable Module (KLM), which supports functions related to TCP connection splicing.

Figure 7:
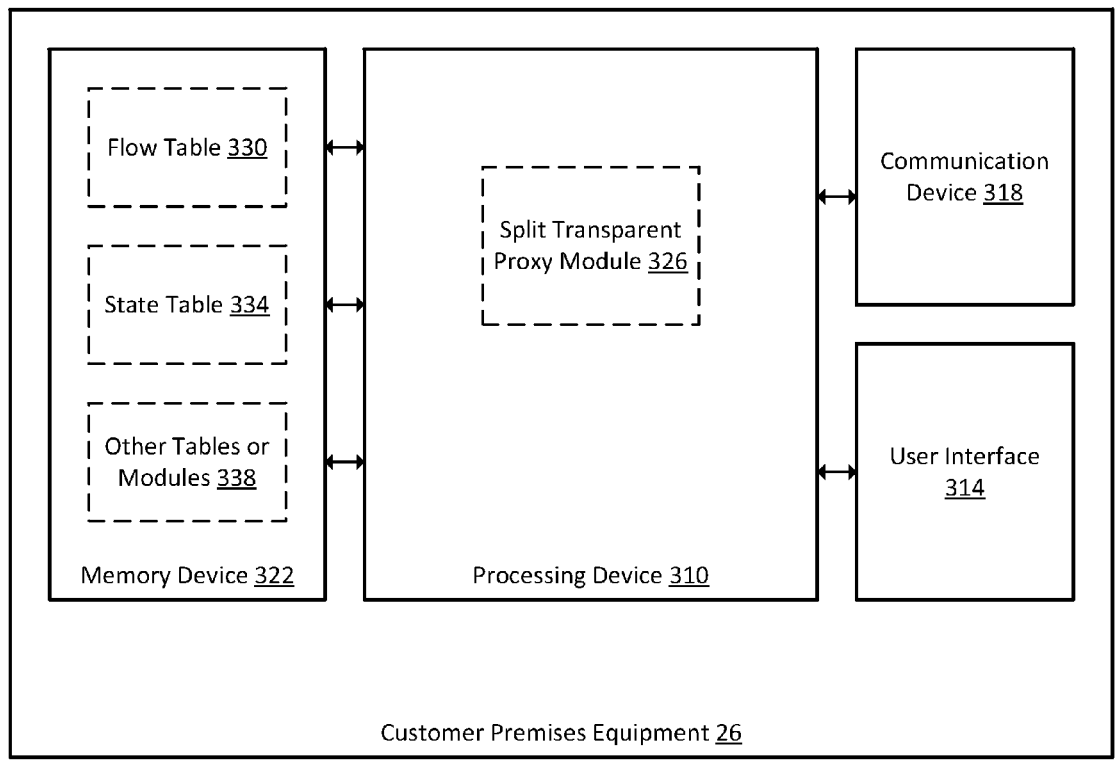
FIG. 7 is a schematic illustrating example components of a customer premises equipment.

Referring now to FIG. 7, a schematic illustrating example components of the CPE 26 is shown. In one example, the computer 26 includes a processing device 310, a user interface 314, a communication device 318, and a memory device 322. It is noted that the computer 26 can include other components and some of the components are not required in every example.

The processing device 310 can include memory, e.g., read only memory (ROM) and random access memory (RAM), storing processor-executable instructions and one or more processors that execute the processor-executable instructions. In embodiments where the processing device 310 includes two or more processors, the processors can operate in a parallel or distributed manner. The processing device 310 can execute the operating system of the computer 26. In the illustrative example, the processing device 310 may also execute a software module 326 such as a split transparent proxy module.

The split transparent proxy module 326 allows a computer 26, customer premises equipment in particular, to communicate with a vendor computer 30 and to distribute various processing and storage tasks with the vendor computer 30. The split transparent proxy module 326 may allow the computer 26 and vendor computer 30 to divide network traffic computation and storage tasks to allow the computer 26 to perform at a high bandwidth. The split transparent proxy module 326 may perform the various tasks discussed herein.

The user interface 314 is a device that allows a user to interact with the computer 26. While one user interface 314 is shown, the term "user interface" can include, but is not limited to, a touch screen, a physical keyboard, a mouse, a microphone, and/or a speaker. The communication device 318 is a device that allows the computer 26 to communicate with another device; such as computers 18, 22, vendor computer 30, or other computers 34. The communication device 318 can include one or more wireless transceivers for performing wireless communication and/or one or more communication ports for performing wired communication.

The memory device 322 is a device that stores data generated or received by the computer 26 and may provide data to the processing device 310. The memory device 322 can include, but is not limited to, a hard disc drive, an optical disc drive, and/or a flash memory drive. The memory device may include a flow table 330 which determines how each flow is handled. The memory device 322 may also include a state table 334 which defines the state of the CPE 26. The memory device may also have other tables or modules 338 as are necessary to implement the various tasks and examples discussed herein.

Figure 8:
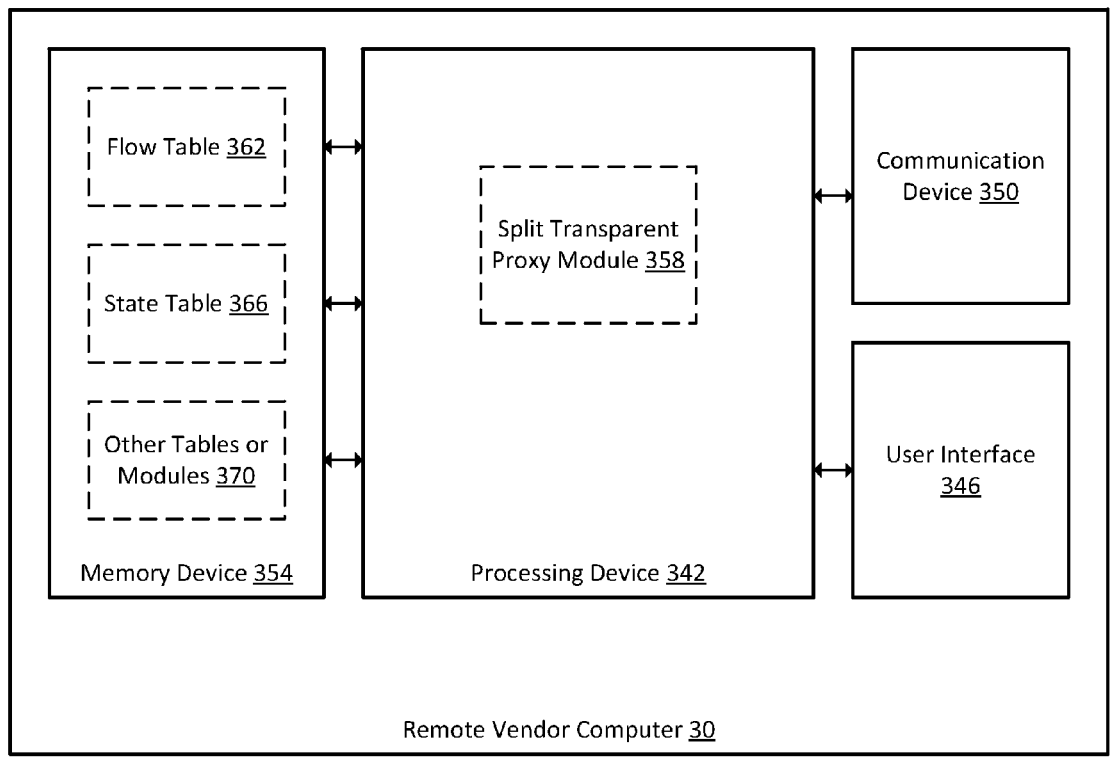
FIG. 8 is a schematic illustrating example components of a remote vendor computer.

Referring now to FIG. 8, a schematic illustrating example components of the vendor computer 30 is shown. In one example, the computer 30 includes a processing device 342, a user interface 346, a communication device 350, and a memory device 354. It is noted that the computer 30 can include other components and some of the components are not required in every example.

The processing device 342 can include memory, e.g., read only memory (ROM) and random access memory (RAM), storing processor-executable instructions and one or more processors that execute the processor-executable instructions. In embodiments where the processing device 342 includes two or more processors, the processors can operate in a parallel or distributed manner. The processing device 342 can execute the operating system of the computer 30. In the illustrative example, the processing device 342 may also execute a software module 358 such as a split transparent proxy module.

The split transparent proxy module 358 allows the vendor computer 30 to communicate with a computer 26, customer premises equipment in particular, to complete various processing and storage tasks associated with the CPE computer 26. The split transparent proxy module 358 may allow the vendor computer 30 to complete network traffic computation and storage tasks to allow the computer 26 to perform at a high bandwidth. The split transparent proxy module 358 may perform the various tasks discussed herein.

The user interface 346 is a device that allows a user to interact with the computer 30. While one user interface 346 is shown, the term "user interface" can include, but is not limited to, a touch screen, a physical keyboard, a mouse, a microphone, and/or a speaker. The communication device 350 is a device that allows the computer 30 to communicate with another device; such as computers 18, 22, and 26. The communication device 350 can include one or more wireless transceivers for performing wireless communication and/or one or more communication ports for performing wired communication.

The memory device 354 is a device that stores data generated or received by the computer 30 and may provide data to the processing device 342. The memory device 354 can include, but is not limited to, a hard disc drive, an optical disc drive, and/or a flash memory drive. The memory device may include a flow table 362 which determines how each flow is handled. The processing device 342 may be used to create the flow table 362 and the communication device 350 may be used to transmit the flow table 362 to the CPE 26. The memory device 354 may also include a state table 366 which defines the state of the CPE 26. The processing device may update the state table 366 as the state of the CPE 26 is updated. The memory device may also have other tables or modules 370 as are necessary to implement the various tasks and examples discussed herein.

The above description of illustrated examples of the present invention, including what is described in the Abstract, are not intended to be exhaustive or to be limitation to the precise forms disclosed. While specific embodiments of, and examples for, the invention are described herein for illustrative purposes, various modifications are possible without departing from the broader scope of the present invention. Indeed, it is appreciated that the specific examples are provided for explanation purposes and that other values may also be employed in other embodiments and examples in accordance with the teachings of the present invention.

What is claimed is:

1. A computer implemented method comprising:
   determining which gateway functions of a computer network are to be performed locally on a customer premises and which are to be performed remotely therefrom, the determining comprising
   receiving, by customer premises computer equipment, a TCP-based data flow from a client;
   the customer premises equipment rewriting an IP header of the data flow and using the rewritten IP header to forward the data flow to a defined TCP port;
   a transient termination server process operating in user space of the customer premises equipment, listening to the defined TCP port, and reading an application payload sent by the client;
   the transient termination server process sending data corresponding to the data flow to a deep packet inspection engine for protocol identification;
   identifying, by the deep packet inspection engine, a protocol associated with the data flow;
   the transient termination server process looking up, based on the protocol identified by the deep packet inspection engine, a handling policy from a policy cache stored in the customer premises equipment; and
   the customer premises equipment assigning one or more gateway functions corresponding to the data flow to be performed either locally or remotely according to the handling policy.

2. The method of claim 1, wherein the determining further comprises the customer premises equipment requesting a handling policy from a remote vendor computer if no relevant handling policy is defined in the policy cache.

3. The method of claim 1, wherein the handling policy indicates that the data should be handled by a fast-path and wherein the method comprises the transient termination server process creating a new TCP connection to a remote vendor computer, sending all application data received from the client to the remote vendor computer, and splicing the client's TCP connection and server TCP connection whereby the transient termination server process removes itself from the connection.

4. The method of claim 1, wherein the handling policy indicates the application payload data should be sent to a remote vendor computer for malware inspection and wherein the method comprises the transient termination server sending a control plane message to the remote vendor computer to request that the remote vendor computer establish a connection to the server whereby the transient termination server process remains interposed in a conversation between the client and the vendor computer.

5. The method of claim 1, wherein the determining further comprises sending all application level data received from the client to the transient termination server process and the transient termination server process using the deep packet inspection engine to attempt to classify an application protocol by inspecting the application level data.

6. The method of claim 1, wherein the determining further comprises the customer premises equipment rewriting an IP header of a client SYN packet with an IP address and port of the transient termination server process and forwarding the SYN packet to a customer premises equipment stack.

7. The method of claim 1, wherein the determining further comprises:
   the transient termination server process recovering port information from an original TCP connection request;
   the transient termination server process sending a message to a transient termination proxy process on a remote vendor computer; and
   the transient termination proxy process establishing a second TCP connection to a destination server.

8. The method of claim 1, wherein the determining further comprises:
   the customer premises equipment storing a flow table that controls processing of data flow based on known characteristics of a data flow;
   a remote vendor computer storing the flow table; and
   using the flow table to provide fast path processing through the customer premises equipment.

9. The method of claim 8, wherein the determining further comprises the remote vendor computer updating the flow table.

10. The method of claim 8, wherein the determining further comprises:
    modeling characteristics of the customer premises equipment as a state;
    storing a model of the customer premises equipment on the remote vendor computer; and
    handling TCP-based data flow as rules engines that can modify the state of the customer premises equipment when needed.

11. A computer system comprising:
    a customer premises computer equipment comprising at least one hardware processor operably connected to memory, the memory storing instructions programmed to determine which gateway functions of a computer network are to be performed locally on a customer premises and which are to be performed remotely therefrom, the determining comprising:
    receiving a TCP-based data flow from a client;
    rewriting an IP header of the data flow and using the rewritten IP header to forward the data flow to a defined TCP port;
    operating a transient termination server process in user space to listen to the defined TCP port and read an application payload sent by the client;
    sending data corresponding to the data flow to a deep packet inspection engine for protocol identification;
    identifying, by the deep packet inspection engine, a protocol associated with the data flow;

looking up, based on the protocol identified by the deep packet inspection engine, a handling policy from a policy cache stored in the customer premises equipment; and assigning one or more gateway functions corresponding to the data flow to be performed either locally or remotely according to the handling policy.

12. The system of claim 11, wherein the customer premises equipment is further programmed to request a handling policy from a remote vendor computer if no relevant handling policy is defined in the policy cache.

13. The system of claim 11, wherein the handling policy indicates that the data should be handled by a fast-path and wherein the customer premises equipment is programmed to create a new TCP connection to a remote vendor computer, send all application data received from the client to the remote vendor computer, and splice the client's TCP connection and server TCP connection to remove itself from the connection.

14. The system of claim 11, wherein the handling policy indicates the application payload data should be sent to a remote vendor computer for malware inspection and wherein the customer premises equipment is programmed to send a control plane message to the remote vendor computer to request that the remote vendor computer establish a connection to the server whereby the transient termination server process remains interposed in a conversation between the client and the vendor computer.

15. The system of claim 11, wherein the customer premises equipment is further programmed to send all application level data received from the client to the transient termination server process and the transient termination server process uses the deep packet inspection engine to attempt to classify an application protocol by inspecting the application level data.

16. The system of claim 11, wherein the customer premises equipment is further programmed to rewrite an IP header of a client SYN packet with an IP address and port of the transient termination server process and forward the SYN packet to a customer premises equipment stack.

17. The system of claim 11, wherein the customer premises equipment is further programmed to:
    recover port information from an original TCP connection request;
    send a message to a transient termination proxy process on a remote vendor computer; and
    wherein the remote vendor computer is programmed to:
    establish, via the transient termination proxy process, a second TCP connection to a destination server.

18. The system of claim 11, wherein the customer premises equipment is further programmed to store a flow table that controls processing of data flow based on known characteristics thereof; and
    wherein a remote vendor computer is programmed to store the flow table; and
    wherein the system is programmed to use the flow table to provide fast path processing through the customer premises equipment.

19. The system of claim 18, wherein the remote vendor computer is further programmed to update the flow table.

20. The system of claim 18, wherein the system is programmed to:
    model characteristics of the customer premises equipment as a state;
    store a model of the customer premises equipment on the remote vendor computer; and
    handle TCP-based data flow as rules engines that can modify the state of the customer premises equipment when needed.

* * * * *